(12) United States Patent
Pitwon (10) Patent No.: US 9,739,941 B2
(45) Date of Patent: Aug. 22, 2017

(54) OPTICAL PRINTED CIRCUIT BOARDS

(71) Applicant: XYRATEX TECHNOLOGY LIMITED, Havant (GB)

(72) Inventor: Richard Pitwon, Hampshire (GB)

(73) Assignee: XYRATEX TECHNOLOGY LIMITED, Havant (GB)

( * ) Notice: Subject to any disclaimer, the term of this patent is extended or adjusted under 35 U.S.C. 154(b) by 0 days.

(21) Appl. No.: 14/596,308

(22) Filed: Jan. 14, 2015

(65) Prior Publication Data
US 2016/0202412 A1    Jul. 14, 2016

(51) Int. Cl.
*G02B 6/12*    (2006.01)
*G02B 6/122*   (2006.01)
*G02B 6/13*    (2006.01)

(52) U.S. Cl.
CPC ........ *G02B 6/1221* (2013.01); *G02B 6/12002* (2013.01); *G02B 6/13* (2013.01)

(58) Field of Classification Search
CPC .... G02B 6/122; G02B 6/12004; G02B 6/132; G02B 6/136; G02B 6/138; G02B 6/1221; G02B 6/12002; G02B 6/13
USPC .......................................... 385/14; 427/163.2
See application file for complete search history.

(56) References Cited

U.S. PATENT DOCUMENTS

| | | | | |
|---|---|---|---|---|
| 5,233,673 A | * | 8/1993 | Vali ........................... | G01S 7/48 385/14 |
| 2005/0100297 A1 | * | 5/2005 | Hamada ................. | B82Y 20/00 385/129 |
| 2009/0290832 A1 | * | 11/2009 | Kim ........................ | G02B 6/132 385/14 |
| 2013/0129934 A1 | * | 5/2013 | Chuang .............. | G02B 6/12007 427/510 |
| 2014/0311570 A1 | * | 10/2014 | Raymond ........... | H01L 31/0547 136/259 |

FOREIGN PATENT DOCUMENTS

JP    2000196314 A  *  7/2000  .............. H01P 5/107

OTHER PUBLICATIONS

Pitwon, Richard C.A. et al., "FirstLight: Pluggable Optical Interconnect Technologies for Polymeric Electro-Optical Printed Circuit Boards in Data Centers," *Journal of Lightwave Technology*, vol. 30, No. 21, Nov. 1, 2012, pp. 3316-3329.

* cited by examiner

*Primary Examiner* — Jerry Blevins
(74) *Attorney, Agent, or Firm* — Mueting, Raasch & Gebhardt, P.A.

(57) ABSTRACT

Disclosed herein are apparatuses that include a first layer that includes glass and a plurality of waveguides disposed in the glass; a second layer that includes a second layer polymer and a plurality of waveguides disposed in the second layer polymer; and a third layer that includes a third layer polymer and a plurality of waveguides disposed in the third layer polymer.

20 Claims, 7 Drawing Sheets

OPTICAL PRINTED CIRCUIT BOARDS

SUMMARY

Disclosed are apparatuses that include a first layer that includes glass and a plurality of waveguides disposed in the glass; a second layer that includes a second layer polymer and a plurality of waveguides disposed in the second layer polymer; and a third layer that includes a third layer polymer and a plurality of waveguides disposed in the third layer polymer.

Also disclosed are apparatuses that include a first layer having a first and second surface and including glass and two parallel rows of waveguides disposed in the glass, the first layer having a thickness from about 250 µm to about 600 µm with a variability in thickness of not greater than about ±10%; a second layer positioned adjacent the first surface of the first layer and including a second layer polymer and a row of waveguides disposed in the second layer polymer; and a third layer positioned adjacent the second surface of the first layer and including third layer polymer and a row of waveguides disposed in the third layer polymer.

Also disclosed are methods of forming an apparatus, the method including providing a first layer, the first layer including glass and having a first and second surface; forming optical waveguides in at least one surface of the first layer; forming a first polymer waveguide on the first surface of the first layer; and forming a second polymer waveguide on the second surface of the first layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Polymer based optical waveguides provide numerous desirable properties for use in a multitude of electronic devices, including in some embodiments, data storage devices, network components, network appliances, routers, hubs and other similar devices. Because of their desirable properties and the desire to provide optical components with more and more waveguides, polymer waveguides have previously been produced that are in essence, a single layer of polymer waveguides stacked on another single layer of polymer waveguides. It would appear that such modular construction would afford optical components with a seemingly limitless amount of waveguides. However, such multilayer polymer components are ineffectual because the thickness of the polymer layers, and thereby the vertical pitch of the waveguides, cannot be controlled accurately enough to meet the strict dimensional tolerance requirements between optical channel positions on standard parallel optical connector interfaces at a reasonable cost.

Disclosed apparatus utilize a glass based layer, whose thickness can be controlled with very high reproducibility in order to create optical interfaces that can include both glass based optical waveguide layers and two or more polymer based waveguide layers in a single apparatus that still affords pitch control at levels that are necessary to provide desired results. The hybrid apparatus affords scalability in optical layers within optical printed circuit boards. Use of such hybrid apparatuses accommodates very short reach, medium reach and long reach optical interconnect types on a single integrated apparatus. Very short reach interconnects might be desired, for example, for use in intra-enclosure communications such as chip-to-chip communication on the same or different boards within a system enclosure. Short reach interconnects may be used for inter-enclosure communication between enclosures in close proximity, for example, between the enclosures in a rack. Medium reach interconnects may be used for shorter intra-data center communication links such as inter-enclosure and inter-rack, for example, for direct connection between enclosures not in close proximity, e.g., enclosures in different racks. Long reach interconnects may be used for longer intra- or inter-data center communication. The apparatuses described herein and methods of making them therefore have a number of variable uses and applications.

Figure 1A:
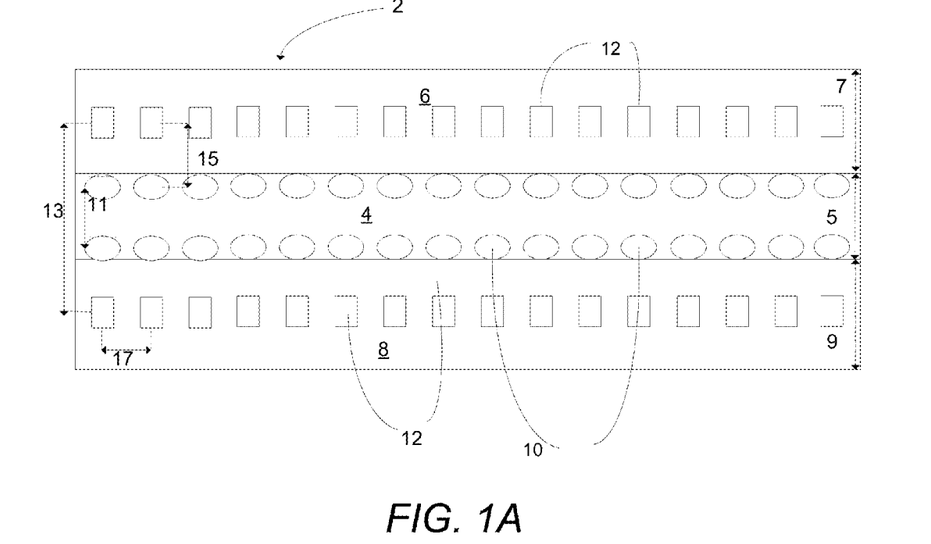
FIGS. 1A, 1B, and 1C depict schematic representations of end facets of illustrative disclosed apparatuses.

FIG. 1A depicts an end facet of an illustrative disclosed apparatus. The apparatus 2 can be referred to as an optical printed circuit board structure, or an optical PCB structure. The apparatus can function as a component or building block of a larger structure or apparatus. Alternatively the apparatus can function on its own without any other related devices or structures. The apparatus can be integrated and connected to other structures and different components as well in order to provide an assembly, for example an optical PCB assembly.

The optical PCB 2 includes a first layer 4, a second layer 6, and a third layer 8. The configuration of the three layers can be as seen in FIG. 1A, a sandwich structure with the second layer 6 and third layer 8 positioned on opposite sides of the first layer 4. This can also be described as the second layer 6 being adjacent a first surface of the first layer and the third layer being adjacent a second surface of the first layer, with the first and second surfaces of the first layer being opposing.

Figure 1B:
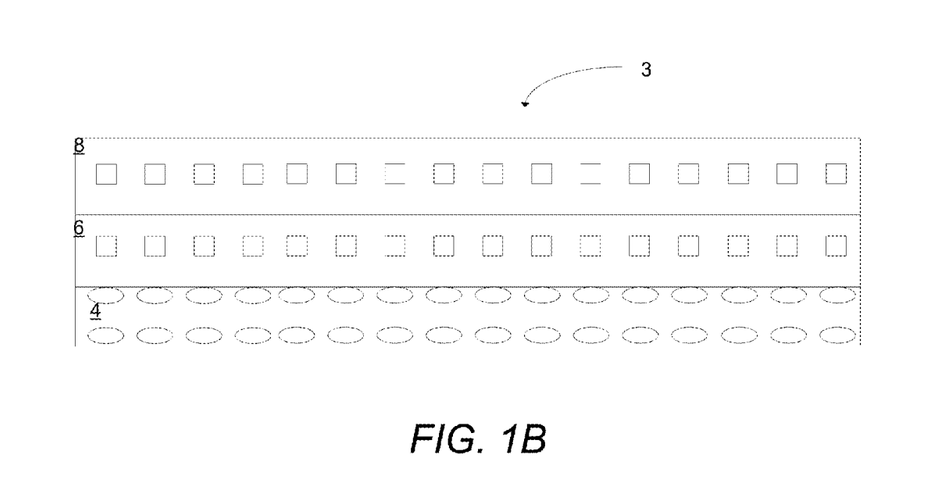
Figure 1C:
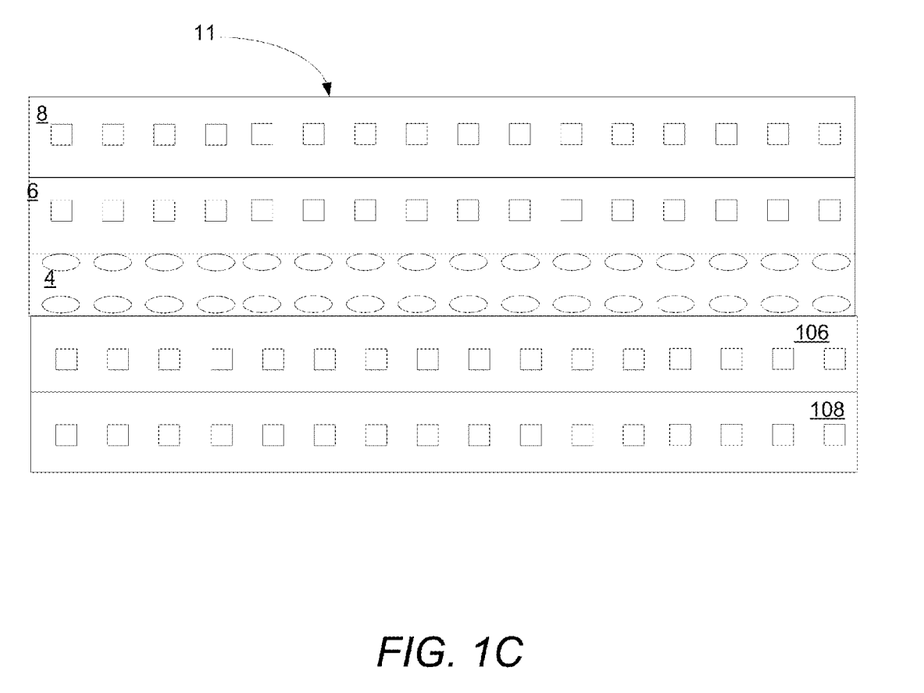

Alternatively, an apparatus 3 can include the second layer 6 and the third layer 8 positioned on the same side of the first layer 4, as seen in FIG. 1B. It should be noted that such an embodiment also discloses the alternative where the third layer 8 is positioned adjacent the first layer 4 and the second layer 6 is positioned adjacent the third layer 8. FIG. 1C shows an apparatus 11 that can be described as including two apparatus such as that depicted in FIG. 1B in combination. The illustrated apparatus can be described as a six layer apparatus that includes double polymer waveguide layers on both sides of a glass waveguide layer. As such, the apparatus 11 includes a first layer 4, an upper second layer 6, an upper third layer 8, a lower second layer 106, and a lower third layer 108. It should be noted that the use of upper and lower are utilized only to delineate the layers and do not imply any orientation of the apparatus 11.

The first layer 4 can generally be described as a planar layer. The first layer 4 can include, for example glass. The first layer 4 can also be referred to as a glass substrate. In some embodiments, the first layer 4 can include an alkali-aluminosilicate (or other material) sheet toughened glass, for example. The first layer 4 has within it a plurality of waveguides 10. The first layer in combination with the plurality of waveguides formed therein can be a planar glass waveguide layer, for example a thin glass foil planar waveguide layer or a thin glass panel planar waveguide layer. The thickness of the first layer 4, the dimension 5 as seen in FIG. 1A can be not less than 62.5 micrometers (μm), not less than 125 μm, not less than 200 μm, not less than 250 μm, or not less than 275 μm. In some embodiments the thickness of the first layer 4 can be 300 μm. In some embodiments, the thickness of the first layer 4 can be not greater than 1 millimeter (mm), not greater than 750 μm, or not greater than 600 μm. In some embodiments, the thickness of the first layer 4 can be 500 μm.

Variability in the thickness of the first layer 4 can be controlled to certain levels. In some embodiments, the variability in the thickness of the first layer 4 can be characterized by surface roughness scans, for example utilizing profilometers. The variability can be described by the surface height variation, which can be expressed as a plus/minus value (e.g., ±x). In some embodiments, the first layer has a thickness with a variability of not greater than ±10%, not greater than ±7%, not greater than ±5%, or not greater than ±1%. In some embodiments, the first layer has a thickness with a variability of not greater than ±0.1%, or not greater than ±0.2%.

The first layer 4 includes within it a plurality of waveguides 10. The first layer can also be described as having at least one row of waveguides, in some embodiments at least two rows of waveguides. In embodiments where there are two rows of waveguides in the first layer they can be two parallel rows of waveguides. The particular number of waveguides within the first layer 4 can vary based on the desired use of the apparatus. In some embodiments, the particular number of waveguides within the first layer 10 can be chosen to be compliant with one or more platforms or standards that are utilized within the optical interconnect industry. In some embodiments, the first layer 4 can include a number of waveguides that allows the apparatus 2 (or 3) to be compliant with one or more standardized optical connector platforms for example. In some embodiments, the first layer 4 can include at least 4 waveguides, at least 8 waveguides, at least 12 waveguides, or at least 16 waveguides. In some embodiments, the first layer 4 can include more than one layer of waveguides 10, for example two layers of waveguides 10, as depicted in FIGS. 1A and 1B. In some embodiments, a first layer 4 can include two layers of 16 waveguides, for example. The number of waveguides in the first layer can also be referred to as the number of channels. A first layer 4 that includes two rows of 16 waveguides at the interface (this particular configuration allows compliance with other devices the apparatus is connecting to, other portions of the apparatus can have virtually any configuration) could be referred to as a 2×16 configuration.

The waveguides 10 can have various dimensions. The dimensions of the waveguides 10 can be determined based on the particular platform that the apparatus is to be used with, for example. Alternatively, or in addition, the dimensions of the waveguides 10 can also be determined based on the way in which they are fabricated. As an example of the possibility of varying the dimensions, it should be noted that the waveguides in FIGS. 1A and 1B have different shapes. For example, the waveguides in the second layer 6 and the third layer 8 in FIG. 1A are shown as rectangular, while the waveguides in the second layer 6 and the third layer 8 in FIG. 1B are shown as square. Any combination of dimensions or configuration can be utilized for any of the waveguides herein.

The apparatus 2 depicted in FIG. 1A (as well as the apparatuses 3 and 11 depicted in FIGS. 1B and 1C) also includes a second layer 6 and a third layer 8. The second layer 6 and the third layer 8 need not be the same, but both generally contain one or more polymers. The second layer 6 and the third layer 8 can generally be described as polymer waveguide layers or more specifically planar polymer waveguide layers. The second layer can be described as including a second layer polymer and the third layer can be described as containing a third layer polymer. Both the second layer polymer and the third layer polymer may include more than one polymer. The second layer polymer and the third layer polymer can, but need not include the same polymer(s). The second layer 6 and the third layer 8 can independently include one or more polymers such as polyacrylates, polysiloxanes, polynorbornenes, or combinations thereof. In some embodiments, the second layer 6 and the third layer 8 can include one or more polysiloxanes, for example. In some embodiments, polysiloxanes such as those available from Dow Corning Corporation (Midland, Mich.).

The thickness of the second layer 6 and the third layer 8, the dimensions 7 and 9 respectively, as seen in FIG. 1A can be not less than 150 μm, not less than 175 μm, or not less than 200 μm. In some embodiments the thickness of the second layer 6 and third layer 8 can both be 200 μm. The polymer need only be thick enough to cover the waveguide material therein with at least 10 μm of polymer. In some embodiments, the thickness of the second layer 6 and the third layer 8 can be not greater than 500 μm, not greater than 400 μm, or not greater than 300 μm. From a practical standpoint, there need not be an upper limit on the thickness of the second layer 6 and the third layer 8. In some embodiments, the thickness of the second layer 6 and the third layer 8 can be 300 μm. In some embodiments, a second layer 6 and/or a third layer 8 can each include two polymer layers, the core having a thickness of 50 μm, for example, and the cladding (e.g., upper and lower cladding surrounding the core) having a thickness of 250 μm, for example. In some embodiments, a second layer 6 and/or a third layer 8 can each include three polymer layers (which may or may not all be the same or different), the core having a thickness of 50 μm, a lower cladding having a thickness of 200 μm, and an upper cladding having a thickness of 50 μm. Such configurations may allow desired optical interface conditions to be met, e.g., a vertical 250 μm center to center pitch. The thickness of the second layer 6 and the third layer 8 can be controlled to within ±1%.

The second layer 6 and the third layer 8 include within each a plurality of waveguides 12. The particular number of waveguides within the second layer 6 and the third layer 8 can vary based on the desired use of the apparatus. In some embodiments, the particular number of waveguides 10 within the second layer 6 and the third layer 8 can be chosen to be compliant with one or more platforms for optical interconnect requirements/standards in data communications platforms that can be utilized within many applications, including for example data centers, high performance computers, automobiles, aerospace, defense, and medical. In some embodiments, the particular number of waveguides 10 within the second layer 6 and the third layer 8 can be chosen to be compliant with one or more platforms that are utilized within the optical interconnect industry. In some embodiments, the second layer 6 and the third layer 8 can include a number of waveguides that allows the apparatus 2 (or 3) to be compliant with or more standardized optical connector interfaces for example. In some embodiments, the number of waveguides in the second layer 6 and the third layer 8 can be the same as the number of waveguides in each row (if more than one row is included) of the first layer 4. In some embodiments, the second layer 6 and the third layer 8 can include at least 4 waveguides, at least 8 waveguides, at least 12 waveguides, or at least 16 waveguides. In some embodiments, a second layer and a third layer can each include 16 waveguides. The number of waveguides in the second layer and the third layer can also be referred to as the number of channels.

The waveguides 12 can have various dimensions depending on the interconnect type for example. The dimensions of the waveguides 12 can be determined based on the particular platform that the apparatus is to be used with, for example. Alternatively, or in addition, the dimensions of the waveguides 12 can also be determined based on the way in which they are fabricated. In some embodiments, the dimensions of the waveguides 12 can be not less than 5 μm, not less than 20 μm, not less than 30 μm, or not less than 40 μm. In some embodiments, the dimensions of the waveguides 12 can be not greater than 100 μm, not greater than 75 μm, not greater than 60 μm, or not greater than 10 μm.

The illustrative apparatuses depicted in FIGS. 1A and 1B, because of the presence of two layers of waveguides in the first layer and one each in the second and third layers can be referred to as a "four layer" apparatus. The "four layer" referring to the number of layers of waveguides. The apparatuses can also be called optical printed circuit boards or optical PCBs. Alternatively therefore they can also be referred to as four layer optical PCBs.

The illustrative apparatus depicted in FIG. 1A includes sixteen channels per row and may be of particular relevance to address 100G Ethernet standards, which could require a 16×25 Gb/s (one row) or 400 G Ethernet standards which could require a 4×16×25 Gb/s (four rows). It should however be noted that the present disclosure is not limited to any particular number of waveguides in any given layer. It should also be noted that any particular illustrated embodiment may be fabricated with any number of waveguides, not only the number which are depicted in the particular figures.

FIGS. 1 to 7 show an exposed surface of disclosed apparatuses. Disclosed apparatuses can either include or be connected to additional portions which include extensions of the waveguides as well as other components. The exposed surface depicted in the figures contained herein can be considered to be a two dimensional optical interface which can connect disclosed apparatuses, which may contain additional components or extensions of the depicted components. It should also be noted that although the waveguides depicted in the accompanying figures are shown in rows that are parallel to other rows of waveguides, the waveguides need not continue on in parallel and indeed can have any other configuration at other points in the apparatus or at other points in components, devices or other apparatuses configured with the disclosed apparatus.

The pitch of one waveguide to another waveguide can also be described. The pitch of any waveguides within any layer (or adjacent layers, as will be described below) can vary based on the desired use of the apparatus. In some embodiments, pitch of any waveguides within any layer (or adjacent layers, as will be described below) can be chosen to be compliant with one or more platforms that are utilized within a number of applications. In some embodiments, the pitch of any waveguides within any layer (or adjacent layers, as will be described below) can be chosen to be compliant with or more standardized optical connector interfaces for example.

As seen in FIG. 1A, there are both horizontal (along a plane parallel to the rows of waveguides) and vertical (along a plane perpendicular to the rows of waveguides) pitches that can be described. The dimension 17 describes the horizontal pitch between two waveguides in the third layer (for example). The dimension 11 describes the vertical pitch between two waveguides in the two different rows of waveguides in the first layer (for example). In some embodiments, the horizontal pitch between two adjacent waveguides in the same layer can be not less than 50 μm, not less than 100 μm, or not less than 200 μm. In some embodiments, the horizontal pitch between two adjacent waveguides in the same layer can be not greater than 300 μm. In some embodiments, the horizontal pitch between two adjacent waveguides in the same layer can be 62.5 μm, in some embodiments 125 μm, in some embodiments 250 μm, or in some embodiments 500 μm, for example. In some embodiments, the vertical pitch between two adjacent waveguides can be not less than 50 μm, not less than 100 μm, or not less than 200 μm. In some embodiments, the vertical pitch between two adjacent waveguides can be 62.5 μm, in some embodiments 125 μm, in some embodiments 250 μm, or in some embodiments 500 μm, for example. In some embodiments, for example multimode waveguides (e.g., ones in which the individual waveguides have dimensions of 50 μm), the tolerance between any two adjacent waveguides can be ±15 μm. In some embodiments, for example single mode waveguides (e.g., ones in which the individual wave guides have dimensions of 5 μm), the tolerance between any two adjacent waveguides can be ±1 μm.

The dimension 15 describes the vertical pitch of one waveguide in the second layer 6 and one waveguide in the first layer 4. As would be understood from the figures, only vertical pitches are relevant to the pitch of waveguides in adjacent layers (with the exception of waveguides in separate apparatus, as could be seen in FIGS. 5-7). In some embodiments, the vertical pitch between two adjacent waveguides in directly adjacent layers can be not less than 50 μm, not less than 100 μm, or not less than 200 μm. In some embodiments, the vertical pitch between two adjacent waveguides in directly adjacent layers can be not greater than 300 μm. In some embodiments, the vertical pitch between two adjacent waveguides in directly adjacent layers can be 62.5 μm, in some embodiments 125 μm, or in some embodiments 250 μm, for example.

The vertical pitch of one waveguide to another waveguide in a layer not directly adjacent the first layer will not be the same as the vertical pitch of waveguides in adjacent layers. This dimension is illustrated by 13 in FIG. 1A. As would be understood from the figures, only vertical pitches are relevant to the pitch of waveguides in non-directly adjacent layers. In some embodiments, the vertical pitch between two waveguides in non-directly adjacent layers can be not less than 500 μm, not less than 700 μm, or not less than 725 μm. In some embodiments, the vertical pitch two waveguides in non-directly adjacent layers can be not greater than 1000 μm, not greater than 800 μm, or in some embodiments not greater than 775 μm for example.

Also disclosed herein are methods of forming apparatuses. Illustrative methods can include steps of forming a first layer, providing a second layer on the first layer, and providing a third layer. In some embodiments, the second layer is provided on, disposed on, or formed on the first layer. In some embodiments the third layer is provided on, disposed on, or formed on the first layer. In some embodiments the second layer is provided on, disposed on, or formed on the first layer and then the third layer is provided on, disposed on, or formed on the first layer, or vice versa. In some embodiments, the second layer is provided on, disposed on, or formed on the first layer and then the third layer is provided on, disposed on, or formed on the second layer. In some embodiments, the third layer is provided on, disposed on, or formed on the first layer and then the second layer is provided on, disposed on, or formed on the third layer.

The step of forming a first layer can include forming the plurality of waveguides. As discussed above, the first layer can include a glass material with a plurality of waveguides disposed therein. One way in which such a layer can be formed includes use of an ion-diffusion process. Such a method can being with a glass panel that can be obtained from various manufacturers. The thickness of such glass panels can be controlled by the manufacturer using standard glass foil fabrication techniques including for example polishing techniques. A masked glass panel can first be immersed in a hot salt solution. Then, certain sections of the glass can be exposed to the solution through gaps in a mask. Ion-exchange occurs between ions in the salt solution and ions in the glass matrix, causing a localized change in refractive index in the exposed glass sections. Once this has been done, which can be achieved to a high level of accuracy using masking techniques, the precise and accurate location of the individual waveguides 10 can be determined. In short, the areas where the refractive index was changed are the plurality of waveguides.

The second and/or third layers can be formed once the first layer is formed. The way in which the second and/or third layers are formed is the same whether the layer is formed on the first layer or on the other of the second and third layers (in a non-sandwich like configuration). First, a first polymer having a relatively low index of refraction is deposited. The first polymer can be deposited using a doctor blade, spin coating, or dip coating for example. The first polymer layer is controlled to have a desired thickness (for example, not less than 50 μm or not less than 80 μm; not greater than 150 μm, or not greater than 125 μm; in some embodiments 100 μm). The first polymer can then be cured, for example blanket cured using UV light. Next, a second polymer having a higher index of refraction is deposited on the cured first polymer layer. The second polymer can be deposited using a doctor blade, spin coating, or dip coating for example. The second polymer layer is controlled to have a desired thickness (for example, not less than 20 μm or not less than 40 μm; not greater than 100 μm, or not greater than 90 μm; in some embodiments 70 μm). The waveguides (12 in FIGS. 1A and 1B) are then formed by patterning techniques including lithography and laser direct imaging (LDI) for example. The portions of the second polymer that are cured ultimately form the waveguide cores. Then, an etching process removes the non-cured portions of the second polymer. Finally, a third polymer having a lower index of refraction material than the second polymer (the same or different than the first polymer) can be added over the cured second polymer portions. The third polymer is added to a thickness that can be measured above the cured portions of the second polymer (however, other measures of thickness could also be utilized). The third polymer can be deposited using a doctor blade, spin coating, or dip coating for example. The third polymer layer can be controlled to have a desired thickness when measured above the cured portions of the second polymer (for example, not less than 10 μm, or not less than 20 μm; not greater than 100 μm, not greater than 60 μm, or not greater than 45 μm; in some embodiments 30 μm).

Horizontal alignment between waveguides in different layers, both adjacent and non-adjacent can be controlled by, for example, utilizing common mask patterns, common fiducials, or both. This can be contrasted to the control of horizontal pitch between waveguides in a single layer which is controlled by the fabrication technique of the waveguides in that layer, e.g., accuracy of masking features in lithography.

Because the second and third layers are fabricated using, for example, three different (in some embodiments two different polymers can be utilized, e.g., a single polymer for the first and third polymers) polymers, properties of the second and third layers can be specifically tailored by choosing appropriate polymers. Furthermore, polymers can be chosen that afford the ability to change the properties thereof in the presence of changing conditions. For example, one or more polymers whose refractive index can change with changing density due to strain or stress (determined by strain-optic coefficient) can be utilized. Polymers whose refractive index changes with changing material density induced by various effects including temperature, electric field, mechanical strain and stress may be utilized. Alternatively, one or more polymers whose refractive index can change with changing electrical fields can be utilized, in some embodiments changes in refractive index due to electrical fields can be enhanced by the addition of chromophores. Alternatively, one or more polymers whose refractive index can change with changing magnetic fields can be utilized. Alternatively, one or more polymers whose refractive index changes with any combination of strain, temperature, electrical fields and magnetic fields may be utilized. Refractive index of the polymer(s) can also be altered with properties other than changes in temperature, electrical field, or magnetic field, for example. Furthermore, properties other than refractive index can also be altered with temperature changes, electrical field changes, or otherwise.

In some embodiments, the first, second, and third polymers can be variants of a single polymer type. Such variants include changes in the refractive index. For example, a polysiloxane based polymer can include a first and third polysiloxane polymer having a given refractive index and a second polymer that is a polysiloxane polymer having a different, higher refractive index.

In some embodiments, a first layer can be formed, using ion diffusion for example, and a second and third layer can be formed on opposing sides thereof by steps including depositing a first polymer, a second polymer, and a third polymer. In some embodiments, the second and third layers can be formed using a total of six different polymers (e.g., three different polymers for each of the second and third layers). In some embodiments, the second and third layers can be formed using not greater than six different polymers. In such embodiments, the inclusion of the substrate (e.g., the glass that will become the first layer of an apparatus) between the second and third offers a spacer, the thickness of which can be very tightly controlled thereby providing a tight control to the vertical pitch of the waveguides in adjacent layers.

Figure 2A:
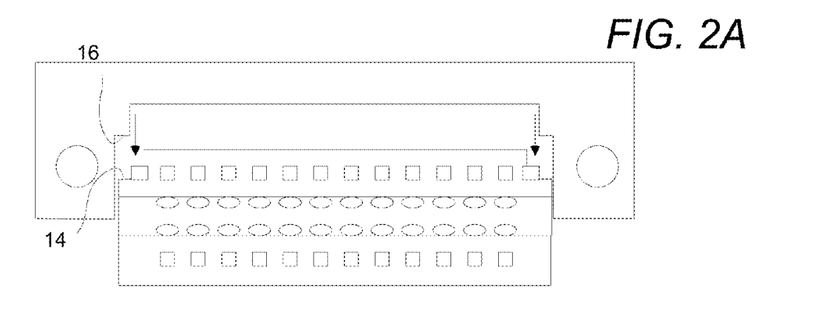
FIGS. 2A and 2B depict schematic representations of an illustrative disclosed apparatus that includes passive assembly of a parallel optical connector ferrule receptacle onto the illustrative apparatus using passive alignment.
Figure 2B:
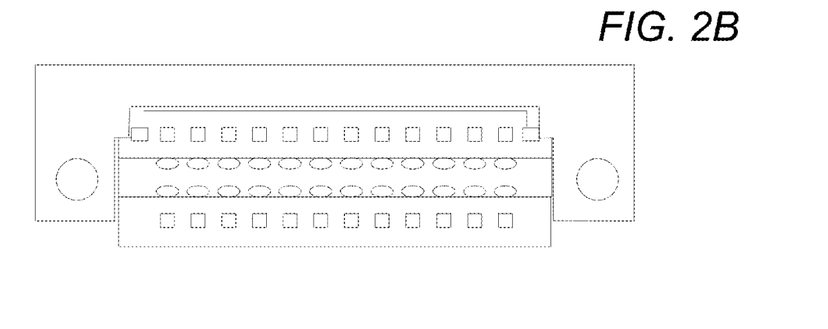

In some embodiments, disclosed apparatuses will include a polymer containing layer (e.g., either the second or third layer) on an external surface. Such configurations can offer advantages because one or more of the polymers (e.g., the first polymer the second polymer, the third polymer, or any combination thereof) can easily be modified to provide an indicator of or an assistant to alignment with an outside device or structure. In some embodiments, the second polymer (e.g, the core of the polymer waveguide layer) can be modified to provide an indicator of alignment and the third polymer (e.g, the upper cladding of the polymer waveguide layer) can be etched away around that indicator of alignment to provide mechanical access. In some embodiments, the third polymer (e.g., the upper cladding of the polymer waveguide layer) can be modified to provide an indicator of alignment. FIGS. 2A and 2B are schematic representations of the passive assembly of a connector receptacle onto a disclosed apparatus using passive alignment to one of the polymer waveguide layers. FIG. 2A shows the apparatus spaced apart from the external structure it is to be aligned with and FIG. 2B shows the apparatus once the two structures are aligned. The passive alignment relies on the fact that the polymer material in either of layers 6 or 8 may be easily, accurately and controllably shaped, varied or removed without risk of damage to any of the remaining structure therein. Therefore alignment features such as the protruding waveguide core layer feature 14 in clearances in the upper cladding (e.g., the third polymer material) can be formed for engagement with corresponding features 16 on the connector receptacle. There are multiple means by which the alignment features 14 may be formed on or in the polymer layer. For example, the use of the same mask used for forming optical waveguides 12 can be utilized to form features such as the core layer feature 14.

Disclosed apparatus can be utilized within larger devices or structures. Disclosed apparatuses such as those depicted in FIGS. 1A and 1B may be referred to as an optical core within an optical PCB assembly (not to be confused with the core of an individual waveguide, e.g. comprising a higher refractive index core embedded within a lower refractive index cladding for optical signal propagation). This is analogous to copper clad "cores" used in the PCB industry. These are based on certain specified thicknesses of a pre-impregnated or "prepreg" material, such as FR4, for example, which are clad on both the top and bottom sides with copper. The top and bottom copper layers of these cores can then be patterned as required by the PCB fabricator. For boards requiring more than two layers which is the case in most PCBs, multiple cores may be laminated together using prepreg material. This is why in traditional PCB stack-ups there is usually provided an even number of layers. This same principle can hereby now be applied to disclosed apparatuses.

Figure 3:
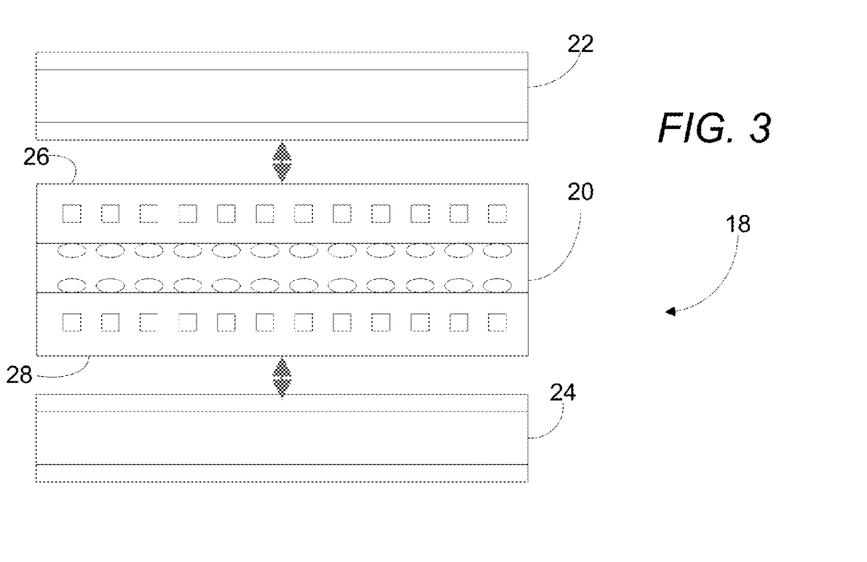
FIG. 3 is a schematic representation of a disclosed apparatus in combination with two copper clad cores.
Figure 4:
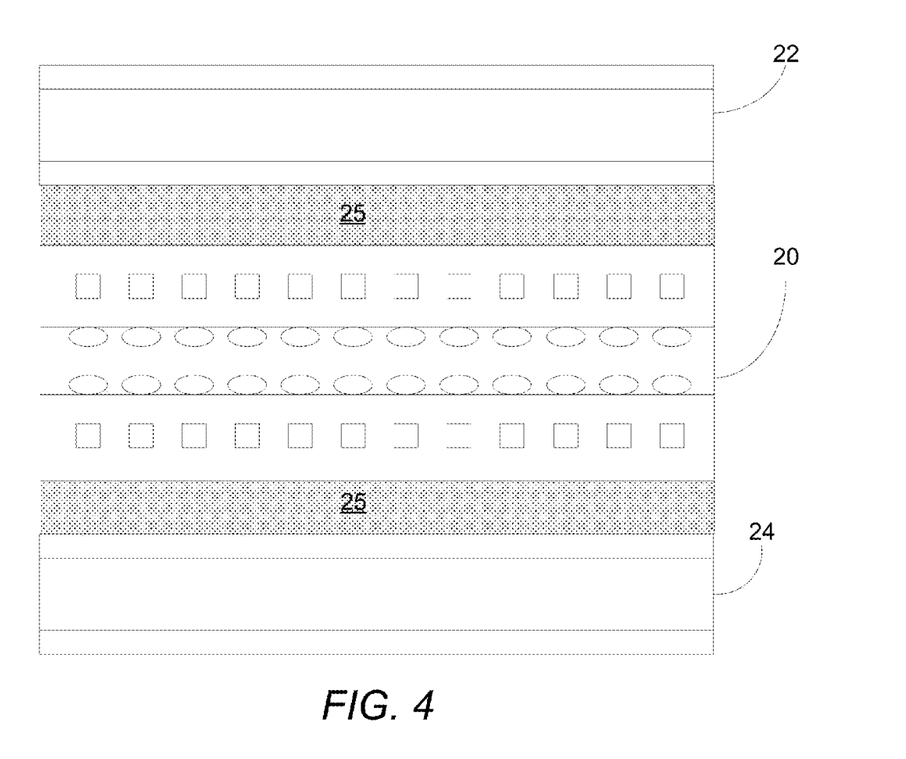
FIG. 4 is a schematic representation of a disclosed apparatus in combination with two copper clad cores.

FIG. 3 shows a schematic representation of the optical portions of an assembly that includes a disclosed apparatus prior to connection of the various layers. The assembly comprises a disclosed apparatus, which can also be referred to as an optical core structure 20 and two copper core structures 22 and 24. As will be explained below, the single optical core structure 20 can be clad on its top 26 and bottom 28 surfaces with prepreg materials. Prepreg materials, as referred to herein, can be described as bonding materials, such as those typically utilized in formation and manufacture of optical printed circuit boards. An example of a prepreg material is FR4, which is widely commercially available. FIG. 4 shows an example of the resultant structure in which an optical core structure 20 has been laminated with layers of prepreg materials 25 prior to arrangement of copper core structures 22 and 24 upon the prepreg material (which function as a binding agent or glue).

Disclosed apparatuses, or optical PCB structures described herein are a versatile component that can be used in the formation of multi-layer optical or hybrid electro-optical PCBs. The principle of the optical core described above provides a modular approach to fabricating electro-optical circuit boards with high numbers of optical layers. As the optical cores can be fabricated separately and then brought together in a final stack-up process, the yield does not decrease exponentially with layer numbers as would be the case with current methods of fabricating multilayer optical PCBs. This modularity is analogous to the underlying principle guiding the use of copper cores in the PCB industry and has never before been applied in the area of optical PCB formation. FIGS. 3 and 4 may be thought of as showing a basic type of optical PCB structure. Other examples are shown in FIGS. 5 to 7.

Figure 5:
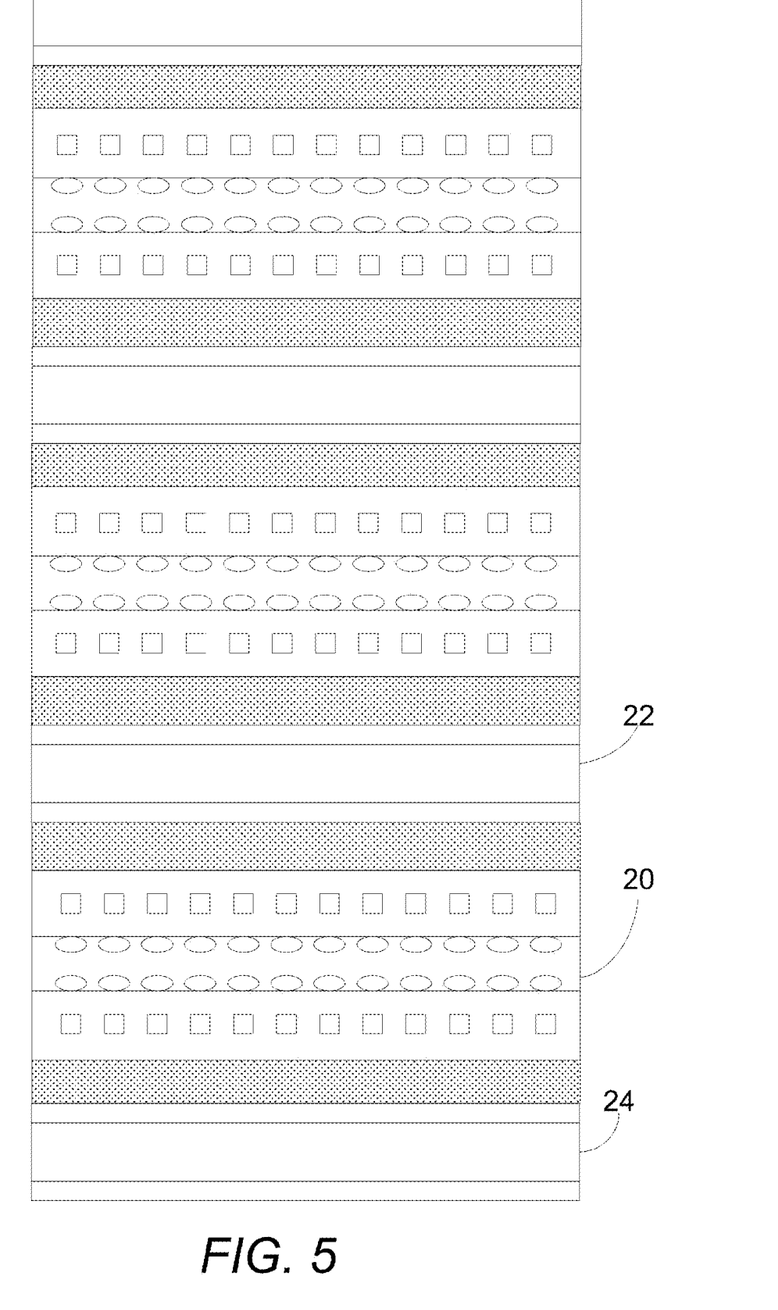
FIG. 5 is a schematic representation of an apparatus that includes three disclosed apparatus alternating with copper clad cores.

FIG. 5 is a structure including three optical core structures each separated from its adjacent one with a copper core and one or more layers of a prepreg material such as FR4. Such an arrangement enables each of the optical core structures to be separately capable of connection or engagement with or use within a connector, since there is sufficient clearance between each of the optical core structures for an individual dedicated connector to couple to it.

Figure 6:
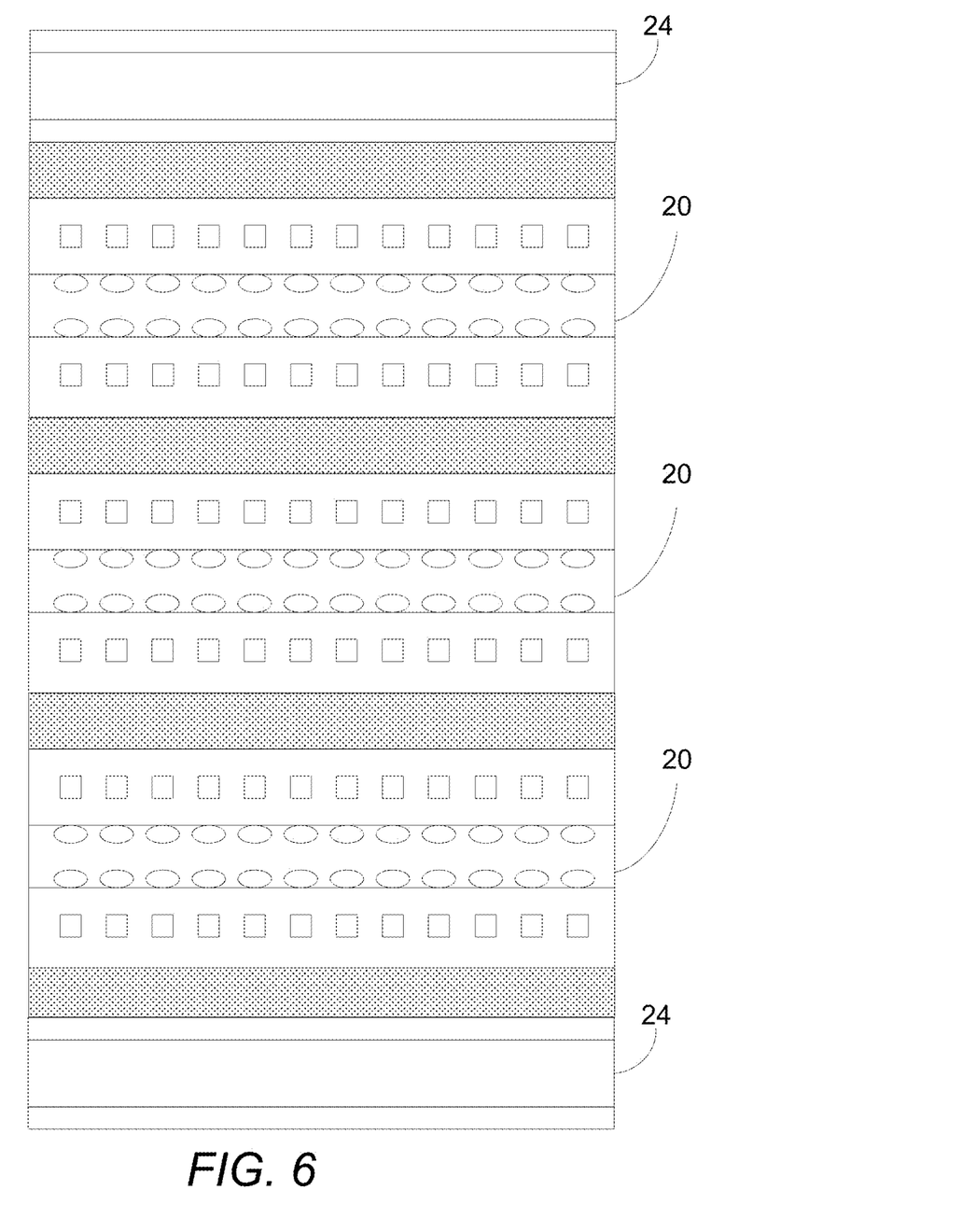
FIG. 6 is a schematic representation of an apparatus that includes multiple disclosed apparatuses bounded by copper clad cores on the top and bottom.
Figure 7:
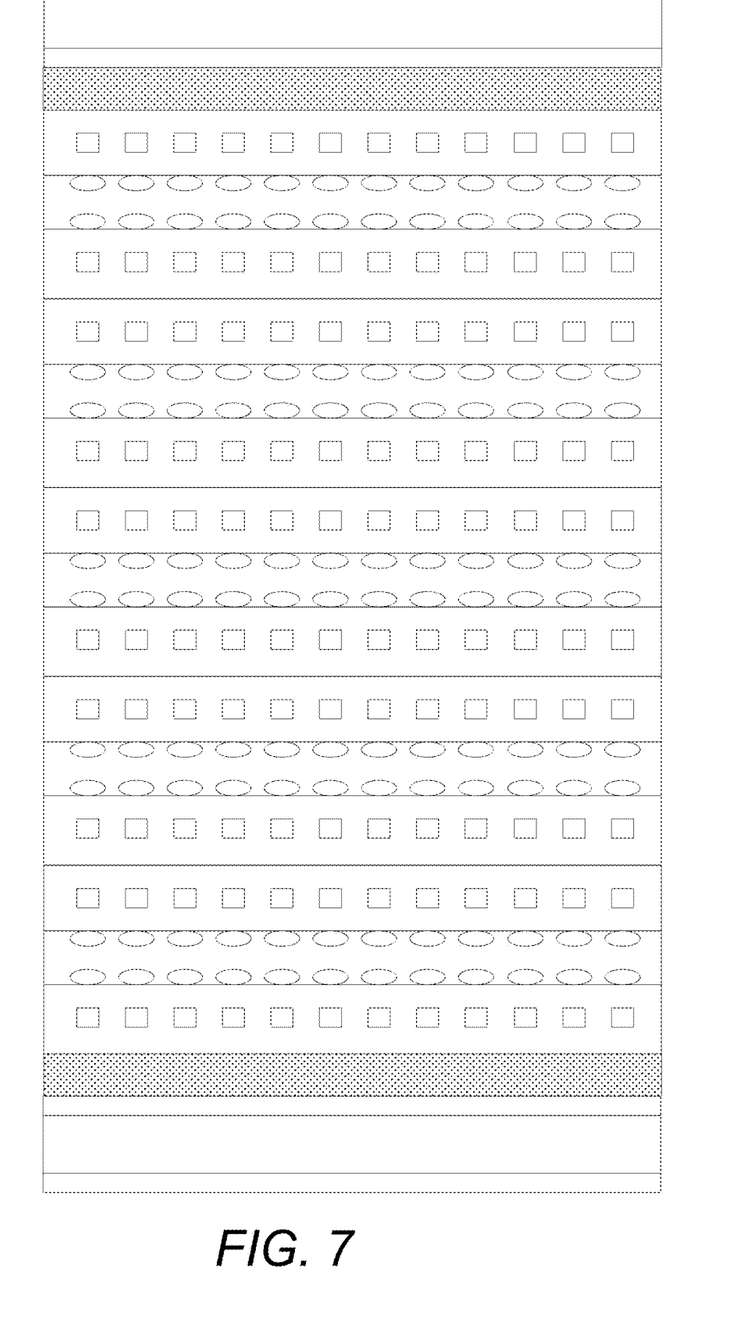
FIG. 7 is a schematic representation of an apparatus that includes multiple contiguous disclosed apparatuses bounded by copper clad cores on the top and bottom.

FIG. 6 is similar to FIG. 5 except between each of the adjacent optical cores there is simply provided a layer of prepreg such as FR4. In FIG. 7 the optical core structures are directly connected to each other such as to form a contiguous sixteen optical layer stack. In all of FIGS. 5 to 7, an assembly is provided including a plurality of optical PCBs or optical cores, in which they are arranged one on top of the other with their input/output interfaces facing in the same direction. It would also be possible to arrange such assemblies with the input/output interfaces facing orthogonal directions, e.g., at 90 degrees to each other. Indeed any desired angular orientation may be provided as required on a per application basis.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of optical printed circuit boards are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   a first layer comprising glass and a plurality of waveguides disposed in the glass;
   a second layer comprising a second layer polymer and a plurality of waveguides that each comprise a cured second layer waveguide polymer, the cured second layer waveguide polymer being different from the second layer polymer and the plurality of waveguides being disposed in the second layer polymer; and
   a third layer comprising a third layer polymer and a plurality of waveguides that each comprise a cured third layer waveguide polymer, the cured third layer waveguide polymer being different from the third layer polymer and the plurality of waveguides being disposed in the third layer polymer.

2. The apparatus according to claim 1, wherein the first layer is positioned between the second and third layers.

3. The apparatus according to claim 1, wherein the thickness of the first layer has a thickness from about 250 µm to about 600 µm.

4. The apparatus according to claim 1, wherein the first layer has a thickness with a variability of not greater than about ±10%.

5. The apparatus according to claim 1, wherein the first layer has a thickness with a variability of not greater than about ±1%.

6. The apparatus of claim 1, wherein the waveguides within each of the layers are parallel to the other waveguides in that layer for at least part of their lengths.

7. The apparatus according to claim 1, wherein the first layer has two parallel rows of waveguides.

8. The apparatus according to claim 1, wherein the horizontal pitch between any two adjacent waveguides is from about 50 µm to about 300 µm.

9. The apparatus according to claim 1, wherein the horizontal pitch between any two adjacent waveguides is about 62.5 µm, about 125 µm, about 250 µm, or about 500 µm.

10. The apparatus according to claim 1, wherein the apparatus has an exposed surface for use as a two dimensional optical interface for a data storage device.

11. The apparatus according to claim 1, wherein at least one of the second or third layers comprises at least one passive alignment feature.

12. The apparatus according to claim 11, in which the second layer has one or more passive alignment features to enable registration or alignment of the apparatus with another component.

13. The apparatus according to claim 1 further comprising a copper core clad structure, bonding laminate, or both.

14. The apparatus according to claim 13, wherein the apparatus is positioned between two copper core clad structures.

15. An apparatus comprising:
   a first layer having a first and second surface and comprising glass and two parallel rows of waveguides disposed in the glass, the first layer having a thickness from about 250 µm to about 600 µm with a variability in thickness of not greater than about ±10%;
   a second layer positioned adjacent the first surface of the first layer and comprising a second layer polymer and a row of waveguides that each comprise a cured second layer waveguide polymer, the cured second layer waveguide polymer being different from the second layer polymer, the cured second layer waveguide polymer having a higher index of refraction than the second layer polymer and the row of waveguides being disposed in the second layer polymer; and
   a third layer positioned adjacent the second surface of the first layer and comprising a third layer polymer and a row of waveguides that each comprise a cured third layer waveguide polymer, the cured third waveguide polymer being different from the third layer polymer, the cured third waveguide polymer having a higher index of refraction than the third layer polymer and the plurality of waveguides being disposed in the third layer polymer.

16. The apparatus according to claim 15, wherein the two rows of waveguides in the first layer each have at least 16 waveguides and the second layer and third layer each have at least 16 waveguides.

17. A method of forming an apparatus, the method comprising
   providing a first layer, the first layer comprising glass and having a first and second surface;
   forming optical waveguides in at least one surface of the first layer;

forming a first polymer waveguide on the first surface of the first layer by at least depositing and curing a first polymer and depositing and at least partially curing a second polymer, such that the second polymer has a refractive index when cured that is higher than the first polymer; and forming a second polymer waveguide on the second surface of the first layer.

18. The method according to claim 17, wherein the step of forming a first polymer waveguide comprises:

removing the uncured portions of the second polymer;

depositing a third polymer, the third polymer having a refractive index when cured that is lower than the second polymer; and curing at least a portion of the third polymer; and the step of forming a second polymer waveguide comprises:

depositing a fourth polymer;

curing the fourth polymer;

depositing a fifth polymer, the fifth polymer having a refractive index when cured that is higher than the fourth polymer;

curing portions of the fifth polymer;

removing the uncured portions of the fifth polymer;

depositing a sixth polymer, the sixth polymer having a refractive index when cured that is lower than the fifth polymer; and curing at least a portion of the sixth polymer.

19. The method according to claim 18, wherein only a portion of the third polymer is cured and removing at least a portion of the uncured third polymer to provide mechanical access to an alignment feature or wherein only a portion of the sixth polymer is cured and removing at least a portion of the uncured sixth polymer to provide mechanical access to an alignment feature.

20. The method of claim 18, wherein one or more of the first, second, third, fourth, fifth and sixth polymers may be the same.

* * * * *

UNITED STATES PATENT AND TRADEMARK OFFICE
CERTIFICATE OF CORRECTION

PATENT NO. : 9,739,941 B2
APPLICATION NO. : 14/596308
DATED : August 22, 2017
INVENTOR(S) : Richard Pitwon Page 1 of 1

It is certified that error appears in the above-identified patent and that said Letters Patent is hereby corrected as shown below:

In the Claims

Column 12 Claim 17, Lines 62-63:
Please add a --:-- after the word "comprising"

Signed and Sealed this
Twenty-fourth Day of April, 2018

Andrei Iancu
*Director of the United States Patent and Trademark Office*